United States Patent
Bose et al.

(10) Patent No.: US 9,830,881 B2
(45) Date of Patent: Nov. 28, 2017

(54) METHOD AND APPARATUS FOR QUANTIFYING COLOR PERCEPTION

(71) Applicant: Adobe Systems Inc., San Jose, CA (US)

(72) Inventors: Shiladitya Bose, Kolkata (IN); Ravi Aggarwal, New Delhi (IN); Amar Kumar Dubedy, Ghaziabad (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 481 days.

(21) Appl. No.: 13/744,672

(22) Filed: Jan. 18, 2013

(65) Prior Publication Data
US 2014/0204109 A1    Jul. 24, 2014

(51) Int. Cl.
*G09G 5/02* (2006.01)
*G06K 9/46* (2006.01)

(52) U.S. Cl.
CPC .......... *G09G 5/02* (2013.01); *G06K 9/4652* (2013.01)

(58) Field of Classification Search
CPC ................ H04N 1/60; H04N 1/6058; G06T 2207/10024; G09G 2340/06
USPC ........................................................ 345/589
See application file for complete search history.

(56) References Cited

U.S. PATENT DOCUMENTS

| | | | | |
|---|---|---|---|---|
| 6,081,276 A | * | 6/2000 | Delp | G01J 3/46 345/589 |
| 6,163,622 A | * | 12/2000 | Abdel-Mottaleb et al. | 382/170 |
| 6,865,302 B2 | * | 3/2005 | Chang | 382/305 |
| 7,245,762 B2 | * | 7/2007 | Shin et al. | 382/165 |
| 2004/0081354 A1 | * | 4/2004 | Mojsilovic et al. | 382/162 |
| 2008/0205755 A1 | * | 8/2008 | Jackson | G06K 9/6212 382/168 |
| 2011/0242306 A1 | * | 10/2011 | Bressler et al. | 348/78 |
| 2012/0013635 A1 | * | 1/2012 | Beeman et al. | 345/590 |
| 2012/0321177 A1 | * | 12/2012 | Suzuki | H04N 1/6061 382/162 |
| 2013/0086509 A1 | * | 4/2013 | Satyanarayana et al. | 715/781 |

OTHER PUBLICATIONS

Lu, Guojun, and Phillips, Jason: Using Perceptually Weighted Histograms for Colour-based Image Retrieval, Signal Processing Proceedings, 1998. ICSP'98. 1998 Fourth International Conference. vol. 2. IEEE, 1998.*

Wikipedia: MacAdam ellipse (as appearing on Jan. 12, 2013 at https://en.wikipedia.org/w/index.php?title= MacAdam_ellipse &oldid=532712016).*

* cited by examiner

*Primary Examiner* — Kumar Patel
*Assistant Examiner* — Richard M Russell
(74) *Attorney, Agent, or Firm* — Keller Jolley Preece

(57) ABSTRACT

A computer implemented method and apparatus for quantifying color perception. The method comprises generating a color lattice, wherein the color lattice represents a mapping of a non-perceptual color space to a perceptual color space; accessing an image, wherein the image comprises a plurality of pixels; and generating a perceptual DNA for the image based on the color lattice.

19 Claims, 12 Drawing Sheets

METHOD AND APPARATUS FOR QUANTIFYING COLOR PERCEPTION

BACKGROUND OF THE INVENTION

Field of the Invention

Embodiments of the present invention generally relate to assessing color and, more particularly, to a method and apparatus for quantifying color perception and searching for a selected quantified color.

Description of the Related Art

With the growth of the Internet, e-commerce is an important way of conducting business. When shopping online, a purchaser may desire a product in a specific color. However, color perception, or how the human eye perceives color, is subjective and varies based on context, such as the level of brightness, or luminance and other factors such as the color of nearby objects, as well as a person's experiences. For example, the term "cherry red" may be selected as the identity of a specific color by one person when viewed in a given context, but may be identified as a different color to another person or even by the same person when the color is viewed in a different context. When shopping online, a purchaser may want to match a color of an item being purchased to the specific color desired by the purchaser based on a prior perception of that color by the purchaser.

A color space describes the way colors can be represented. Standard red-green-blue (sRGB) is defined by adding red, green, and blue light together in various ways to produce a broad array of colors. The main purpose of the sRGB color space is for the sensing, representing, and displaying images in electronic systems. Hence, sRGB color space is the working color space of computer monitors, printers, and the internet because it models the output of physical devices rather than human vision perception. sRGB is not a perceptual color space. "Lab" color space is a perceptual color space, meaning the color is designed to approximate human vision. The L component of Lab stands for luminosity, or brightness, and ranges from dark to bright. The a and b components of Lab stand for chroma (that is, the color components). The a component ranges from green to magenta, while the b component ranges from blue to yellow. The L component closely matches human perception of lightness. With a constant chromaticity, perceived colorfulness increases with an increase in luminance, meaning even though a color remains constant, seeing the color in a less bright light causes the human eye to perceive the color as more intense.

The RGB color space comprises 256 values for red (R), 256 values for green (G) and 256 values for blue (B). The result is $256^3$ possible color combinations, however, each color combination in the RGB color space is not in fact perceptually unique. Since the Lab color space approximates human vision perception, it comprises significantly fewer than $256^3$ colors in its color space and is better adapted to characterize human perception of color images as compared with the RGB color space. Because not every color in an RGB color space represents a perceptually unique color, when a purchaser selects on item online using an RGB color space, an acceptable match is not always received. The purchaser may receive an item in a color that the purchaser had not intended. This results in a poor user experience.

Therefore, there is a need for a method and apparatus for quantifying color perception.

SUMMARY OF THE INVENTION

A method and apparatus for quantifying color perception substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
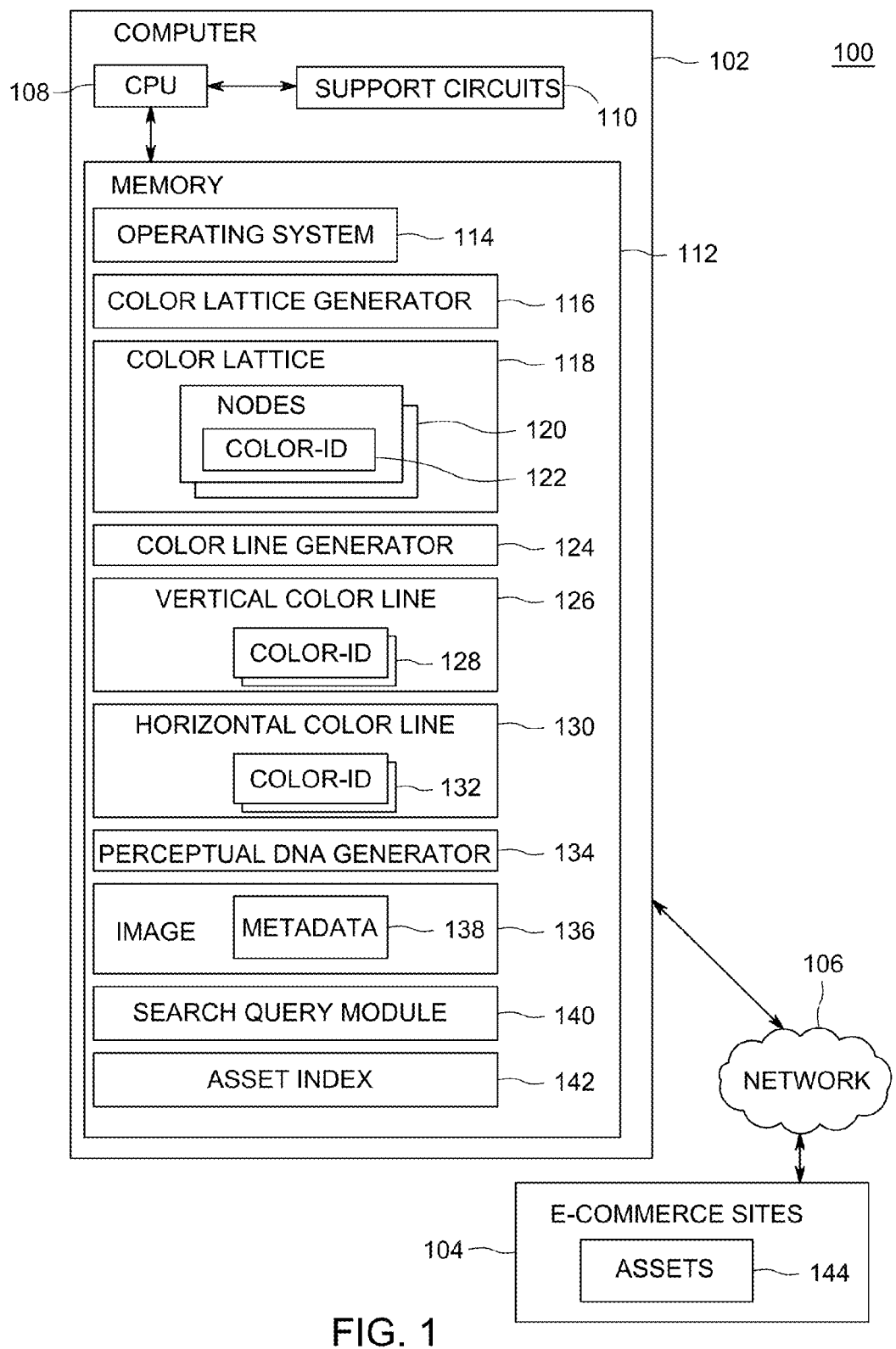
FIG. 1 is a block diagram of a system for quantifying color perception, according to one or more embodiments.

While the method and apparatus is described herein by way of example for several embodiments and illustrative drawings, those skilled in the art will recognize that the method and apparatus for quantifying color perception is not limited to the embodiments or drawings described. It should be understood that the drawings and detailed description thereto are not intended to limit embodiments to the particular form disclosed. Rather, the intention is to cover all modifications, equivalents and alternatives falling within the spirit and scope of the method and apparatus for quantifying color perception defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Furthermore, the term "e-commerce site" means any electronically accessible site a user may communicate with in order to make a desired selection, with or without the requirement of a financial transaction associated with the selection. Additionally, the term "perceptually indistinguishable" includes substantially indistinguishable by human visual perception.

DETAILED DESCRIPTION OF EMBODIMENTS

Embodiments of the present invention comprise a method and apparatus for quantifying color perception. A color lattice is generated that represents a mapping of a non-perceptual color space, such as an sRGB color space, to a perceptual color space, such as a Lab color space. Because the Lab color space is a perceptual color space, when the chroma ("a" and "b" color components) remain constant, and the luminosity ("L" component) changes, the perceived color changes. However, the color change is not perceptible for each value of L.

There are ranges of L for which the color is perceptually similar (we call this realization heuristic 1). For example, there may be 1000 values of luminosity, but within a given range of luminosity values, such as from values 0-26, 27-53, or 54-80, the color does not change perceptually. The ranges of luminosity within which there is no perceptible color change are called L-bins. Within each L-bin, or range of luminosity values, the chroma values change. Each bin is divided into sub-regions, wherein within each sub-region, although the chroma values change, the color space is perceptually similar (we call this realization heuristic 2). Hence, according to heuristic 1 and heuristic 2, a given sub-region represents a three-dimensional space, or volume, of a range of luminosity values and changing chroma values for which there is no perceptible change in color. Each sub-region is given a color ID.

Using the above technique, the number of perceptually different sub-regions (or color ID's) that can be used to describe any perceptible color is substantially less than the $256^3$ number of possibilities provided by an RGB system. The color lattice maps a non-perceptual color space to a perceptual color space, such as a Lab color space, and to that end is made up of nodes on planes, each plane representing a range of L values, and each node representing a given sub-region within a given range of L values, such that the color values within that sub-region are perceptually similar. Thus, each node is associated with a perceptually unique color and given a respective unique color_id.

The color lattice serves as a map to create a perceptual deoxyribonucleic acid (perceptual DNA) for an image. Human DNA carries genetic information that can be used to uniquely identify a person. Similarly, the perceptual DNA of an image comprises all of the perceptible colors of an image and uniquely identifies the image. For each pixel in the image, the color_id of the pixel's color is retrieved from the color lattice. A perceptual histogram is created representing the color ids and their associated frequency. The percentage contribution of a color_id to the image is calculated and a text tag describing the color_id and its percentage contribution is generated. The text tag is the perceptual DNA of the image. Thereafter, a search may be performed where the perceptual DNA is generated for searchable images and images with perceptual DNA that match the perceptual DNA of a given image within a predefined threshold, are retrieved.

Advantageously, the present invention may be used in applications involving color, such as ADOBE® KULER® or ADOBE® PHOTOSHOP® as well as other tools available in ADOBE® CREATIVE CLOUD™, where perceptual color matching is important to a user.

Various embodiments of a method and apparatus for quantifying color perception are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for quantifying color perception, according to one or more embodiments. The system 100 comprises a computer 102 and a plurality of e-commerce sites 104 communicatively coupled to each other via a network 106. The computer 102 comprises a Central Processing Unit (CPU) 108, support circuits 110, and a memory 112. The CPU 108 may comprise one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 comprises at least one of Read Only Memory (ROM), Random Access Memory (RAM), disk drive storage, optical storage, removable storage and/or the like.

The memory 112 comprises an operating system 114, a color lattice generator 116, a color lattice 118, a color line generator 124, a vertical color line 126, a horizontal color line 128, a perceptual DNA generator 134, an image 136, a search query module 140, and an asset index 142. The operating system 114 may comprise various commercially known operating systems. The color lattice 118 comprises a plurality of nodes 120, wherein each node comprises a color_id 122. The vertical color line 126 comprises a plurality of color_ids 128. The horizontal color line 128 comprises a plurality of color_ids 132. Each e-commerce site 104 comprises a plurality of assets 144. The assets 144 are images of items available from the e-commerce site 104.

The color lattice generator 116 generates the color lattice 118. The color lattice generator 116 maps values from a non-perceptual color space, for example, the RGB color space to a unique color ID in a perceptual color space, for example the Lab color space. Within the Lab color space, there are ranges of L, luminosity, where, when the a and b values remain constant and the L changes within the range, there exists no perceptual difference in color. Each range of L is referred to as a bin. Within each bin, where the a and b values change, there are specific sub-regions within the bin where the color is perceptually similar. Each bin is treated as a plane on the color lattice 118. Each specific sub-region with a bin is represented as a node 120 on the plane for that bin. Each node is associated with a color_id 122. The color lattice generator 116 creates edges between nodes 120 on a plane and its adjacent nodes 120. The color lattice generator 116 also creates edges between corresponding nodes 120 on different planes of the color lattice 118.

The color line generator 124 generates the horizontal color line 130. The color line generator 124 traverses the nodes 120 of the color lattice 118. The color line generator 124 traverses each plane of the color lattice 118 starting the traversal at the lowest luminosity plane, traversing from one node 120 to the next adjacent node 120. The color line generator 124 stores the color_id 122 of each node 120 that it traverses until all nodes 120 of the luminosity plane have been traversed and then the color line generator 124 proceeds to the next luminosity plane and repeats the process until all nodes 120 of all luminosity planes have been traversed. When all of the luminosity planes have been traversed, the color line generator 124 stores the horizontal color line. The color line generator 124 then generates the vertical color line 126 in a similar manner. The color line generator 124 starts the traversal at the bottom corner node 120 of the color lattice 118 and, traverses from the lowest level luminosity plane to the next lowest level luminosity plane, and so on until the highest level luminosity plane is reached and then traverses to the next adjacent node 120 on the highest level luminosity plane and then traverses back down from plane to plane until the lowest level luminosity plane is reached and continues until all nodes 120 of the color lattice has been traversed. Every node 120 of the color lattice 118 is associated with a position in the horizontal color line 130 and the vertical color line 126. Nodes in close proximity on the color lines have perceptually related colors.

A user may select an image with a color that the user would like to match with an asset on an e-commerce site. Before an asset match can be found, the perceptual DNA for the image must be determined. For each pixel of the image, the perceptual DNA generator 134 retrieves a corresponding color_id from the color lattice 118. The perceptual DNA generator 134 generates a perceptual histogram for the image using the color ids and the frequency of each color_id. In some embodiments, the perceptual DNA generator 134 then calculates the percentage contribution of a color_id to the entire image and then generates a text tag describing the color_id and its percentage contribution. For example, if color_id 20 contributes to 30% of the image, the tag c20p30 is generated. A set of all text tags forms the perceptual DNA for an image and these tags are embedded in the metadata 138 of the image 136.

In another embodiment, where the horizontal color line 130 and the vertical color line 126 are implemented, for each pixel of the image, the perceptual DNA generator 134 retrieves a corresponding color_id position from both the horizontal color line 130 and the vertical color line 126. The perceptible DNA generator 134 generates two DNAs for the image, specifically, a vertical DNA and a horizontal DNA. To do so, for each of the vertical and horizontal DNAs, the perceptible DNA generator 134 builds a histogram of frequency versus color line positions. The perceptible DNA generator 134 normalizes the histogram and sorts the color line positions in the histogram. The color line positions in the histogram are then pushed to a binary stream (V) and the frequencies corresponding to the values in V are pushed to a binary stream (F). The bit stream V and F is a probability distribution. One is created for a horizontal DNA and one for a vertical DNA are created.

When a search is performed to find assets comprising the same or similar colors, i.e., comprising similar perceptual DNA, the search query module 140 accesses the asset index 142. The asset index 142 is an index of assets 144. The asset index 142 may be created using any technique used by search engines currently known in the art. However, where a document search engine may index words of documents, the asset index comprises the perceptual DNA of assets. In some embodiments, the search query module 140 expands the perceptual DNA of the image 136 and compares the expanded DNA to the perceptual DNAs of assets in the asset index 142. The search query module 140 displays all assets 144 that match the expanded perceptual DNA of the image 136.

In another embodiment, the search query module 140 compares the horizontal DNA of the image 136 with the horizontal DNA of an asset. Using a measure to determine the difference between two probability distributions, such as Kullback-Leibler divergence (KL-Div), the horizontal DNA of the image is compared to the horizontal DNA of the asset. The vertical DNA of the image is also compared to the vertical DNA of the asset. A similarity score is determined based on the KL-Div measures of the horizontal and vertical DNAs. The search query module 140 displays a predefined number of assets with the highest similarity scores. Advantageously, a lookup on a one-dimensional color line is very fast. Positions on the line that are close to one another imply closer colors. For example, if two RGB values, such as RGB1 and RGB2 map to positions 10 and 12 on a color line, they represent colors that are perceptually close. Comparing these values in binary to detect numerically close number is extremely fast and can make up to one billion comparisons per second. These speeds allow for very fast DNA comparisons for a large number of assets.

Figure 2:
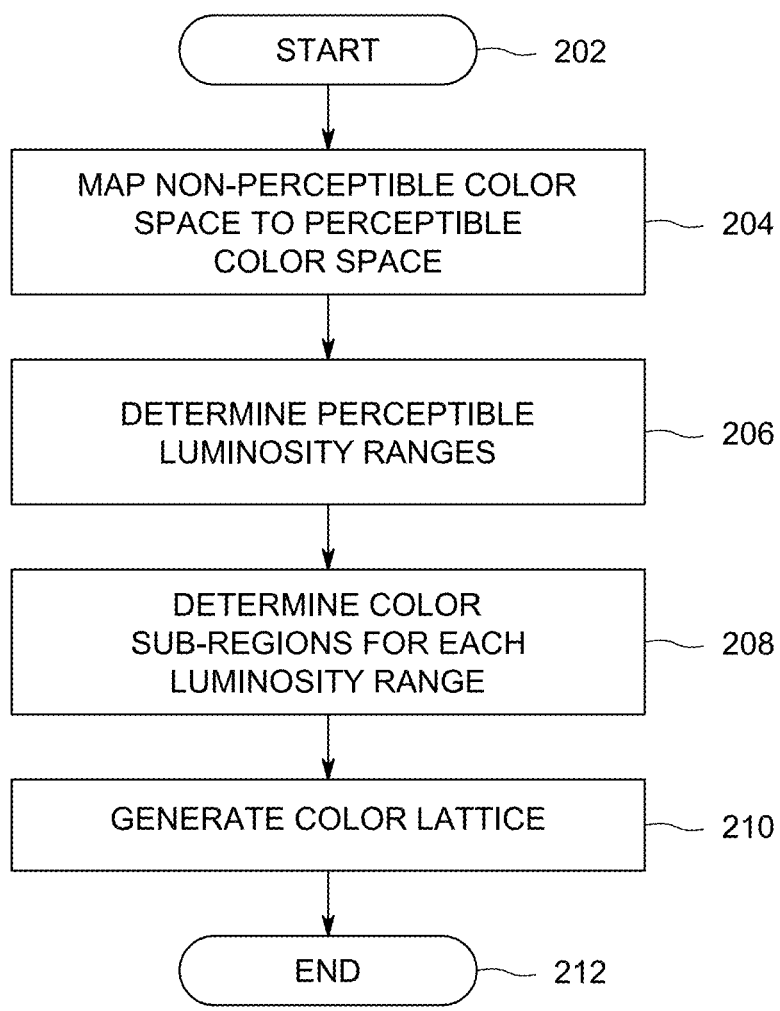
FIG. 2 depicts a flow diagram of a method for generating a color lattice as performed by the color lattice generator of FIG. 1, according to one or more embodiments.

FIG. 2 depicts a flow diagram of a method 200 for generating a color lattice as performed by the color lattice generator 116 of FIG. 1, according to one or more embodiments. The method 200 maps the colors in a non-perceptual color space to the colors in a perceptual color space, identifies perceptually different colors within perceptually different ranges of luminosity and generates a color lattice from the identified colors.

The method 200 starts at step 202 and proceeds to step 204. At step 204, the method 200 maps values of a non-perceptual color space, such as the sRGB color space, to the values of a perceptual color space, such as the Lab color space. Mapping a non-perceptual color space to a perceptual color space is well known to those skilled in the art. Because the different values within the sRGB color space are not all perceptually different, multiple sRGB colors values map to a single Lab value. Because the Lab color space is a perceptual color space, when the chroma ("a" and "b" color components) remain constant, and the luminosity ("L" component) changes, the perceived color changes. However, the perceived color change is not perceptible for each value of L. There are ranges of L for which the color is perceptually similar. These luminosity ranges are hereafter referred to as L-bins.

The method 200 proceeds to step 206, where the method 200 determines the L-bins that exist for which the color space of the non-perceptual color space maps into the perceptual color space. For example, when mapping the sRGB color space to the Lab color space, 38 ranges of luminosity exist within the Lab color space for which there is no perceptual color difference. Therefore, there are 38 L-bins.

The method 200 proceeds to step 208, wherein the method 200 determines sub-regions within a given L-bin, wherein changes in ab for the constant L does not result in a perceptible color change. For a given L-bin, there exist sub-regions of ab values where, although the ab values change, there is no perceptual change in color, as described in further detail with respect to FIG. 3, below. The method 200 proceeds to step 210, where the color lattice is assembled as described in further detail with respect to FIG. 4, below. The method 200 proceeds to step 212 and ends.

Figure 3:
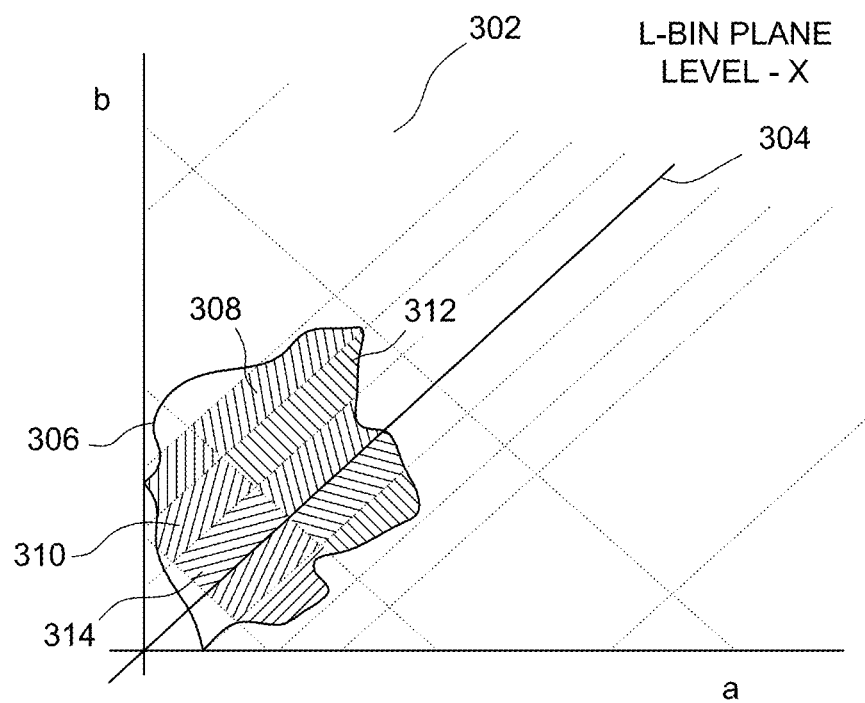
FIG. 3 depicts a block diagram illustrating a division of a range of luminosity into a plurality of sub-regions, according to one or more embodiments.

FIG. 3 depicts a block diagram 300 illustrating a division of a range of luminosity into a plurality of sub-regions, according to one or more embodiments. The block diagram 300 comprises a luminosity level 302 represented by a Euclidean plane. Luminosity level 302 represents a cross-section of one specific luminosity value within an L-bin. Line 304 represents a line within the luminosity level 302, wherein the chroma values (the "a" and "b" components) are equal. Along line 304, the color is not perceptibly distinguishable. Also, above and below this line in a three-dimensional space (for other values of luminosity within this L-bin) the color change is also not perceptibly distinguishable.

The area 306 represents a subset of valid colors within the luminosity level 302, where as the chroma values change, the color is still perceptible. The space outside of the area 306 represents colors that cannot be perceived by the human eye. Within the area 306, there are sub-regions, for example, 308, 310, 312, and 314, arranged parallel to line 304, wherein within each sub-region, although the chroma values change, the color is perceptibly similar. Although block diagram 300 is shown in two-dimensions, a given sub-region comprises not only the chroma values where the color is at luminosity level 302, but also extends through the remainder of the range of luminosity values for the L-bin that includes luminosity level 302. Hence, a sub-region is a three-dimensional volume representing a single perceptible color in the Lab color space.

As noted above, sub-regions arranged parallel to line 304 are determined for each L-bin. There may be a different number of sub-regions in each L-bin. For example, in the lowest ranges of luminosity, the color space is so dark that very few colors are perceptibly different. Similarly, in the highest ranges of luminosity, the color space is so light that few colors are perceptibly different. In the middle ranges of luminosity, there exist a plurality of perceptible colors and moving from a middle range of luminosity to a next higher range of luminosity, for example, from bin 20 to bin 21, a specific set of chroma values (a given "a" component and a given "b" component) represent the same "color", in both bins, but the increase in luminosity represented in bin 21 causes the color to be perceived as brighter, and therefore entitled to a different color_id. For example an "ab" value in bin 20 may be "blue" and the same values of "ab" in bin 21 may be "light blue".

Figure 4:
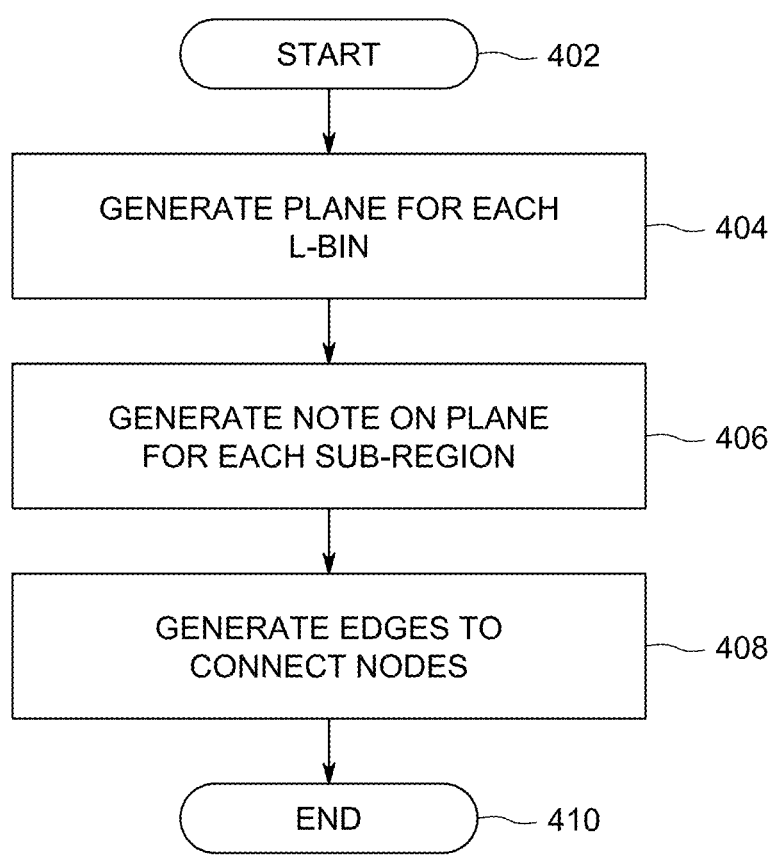
FIG. 4 depicts a flow diagram of a method for assembling a color lattice as performed by the color lattice generator of FIG. 1, according to one or more embodiments.
Figure 5:
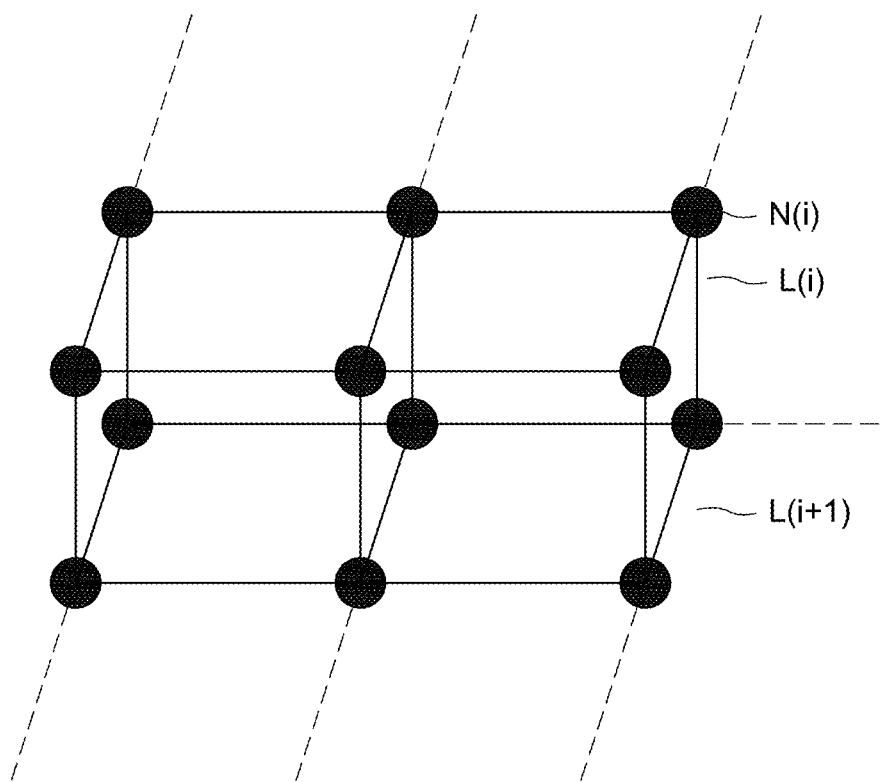
FIG. 5 depicts a block diagram of a portion of a color lattice generated by the color lattice generator of FIG. 1, according to one or more embodiments.

FIG. 4 depicts a flow diagram of a method 400 for assembling a color lattice as performed by the color lattice generator 116 of FIG. 1, according to one or more embodiments. A representative color lattice is shown in FIG. 5, illustrating two L planes, where each plane illustrates six nodes and is discussed in conjunction with FIG. 4. The color lattice is used for the purpose of generating perceptible DNA and searching for similar colors in the color space in order to expand search criteria when searching for assets having a perceptible DNA that match the perceptible DNA of a given image. The method 400 creates a plane L(i) representing each L-bin and nodes N(i) on each plane representing the sub-regions. Lastly, the method 400 generates edges to connect adjacent nodes in the color lattice. The method 400 starts at step 402 and proceeds to step 404.

At step 404, the method 400 generates a plane of the color lattice for each L-bin determined in step 206. Two such planes are illustrated in FIG. 5. In the current example, there are 38 bins. Therefore, the color lattice is made up of 38 planes, one for each L-bin. The method 400 proceeds to step 406, where for each plane, the method 400 generates a node on the plane for each sub-region determined in step 208. The method 400 proceeds to step 406, where the method 400 generates edges between each node and its adjacent nodes on a given plane. The method 400 then creates edges connecting nodes for corresponding values of ab between adjacent planes. The result is the color lattice, a portion of which is shown in FIG. 5, wherein each plane represents a level of luminosity L(i) and each node N(i) on each plane represents a distinct perceptible color (color_id) within that level of luminosity. The method 400 proceeds to step 410 and ends.

Figure 6:
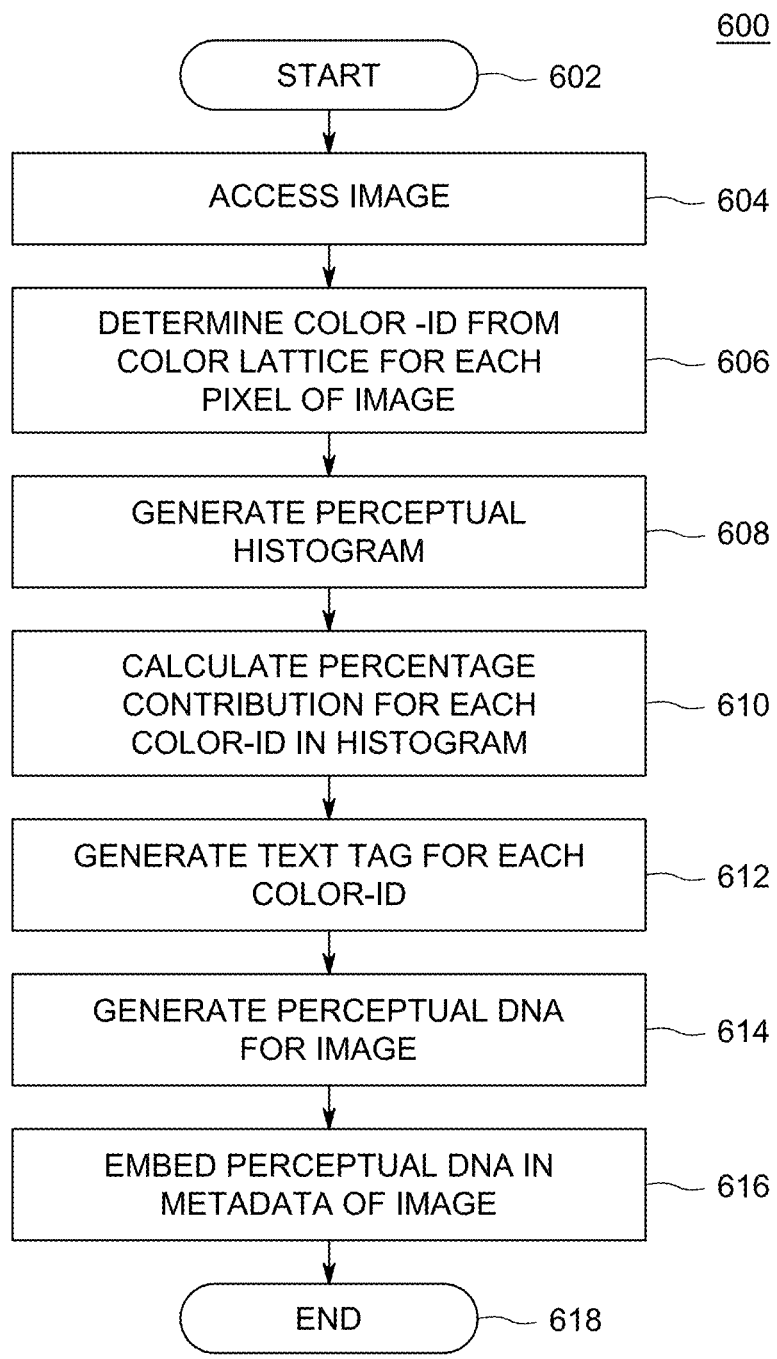
FIG. 6 depicts a flow diagram of a method for generating a perceptual deoxyribonucleic acid (DNA) for an image as performed by the perceptual DNA generator of FIG. 1, according to one or more embodiments.

FIG. 6 depicts a flow diagram of a method 600 for generating a perceptual DNA for an image as performed by the perceptual DNA generator 134 of FIG. 1, according to one or more embodiments. The method 600 iterates through each pixel of an image to determine an associated color_id for each pixel from the color lattice. The method 600 then generates a histogram of the color_ids and the frequency of each color, thereby defining a perceptual DNA for the image.

The method 600 starts at step 602 and proceeds to step 604. At step 604, the method 600 accesses an image. The method 600 proceeds to step 606, where the method 600 determines, for each pixel of the image, a corresponding color_id from a matching color node on the color lattice. The method 600 proceeds to step 608, where the method 600 generates a perceptual histogram for the image. The perceptual histogram is a histogram of color_ids and their frequency for the image. The method 600 proceeds to step 610, where the method 600 calculates a percentage contribution of each color_id to the image as a whole. The method 600 determines the frequency of the color_id divided by the total number of color_ids.

The method 600 proceeds to step 612, where the method 600 generates a text tag describing the color_id and its percentage contribution. For example if color_id 20 contributes to 30% of the image, the method 600 generates the text tag, c20p30. The method 600 proceeds to step 614, where the method 600 creates a perceptual DNA for the image by creating a set of all text tags to the perceptual DNA. The method 600 proceeds to step 616, where the method 600 embeds the perceptual DNA in the metadata of the image. The method 600 proceeds to step 618 and ends.

Figure 7:
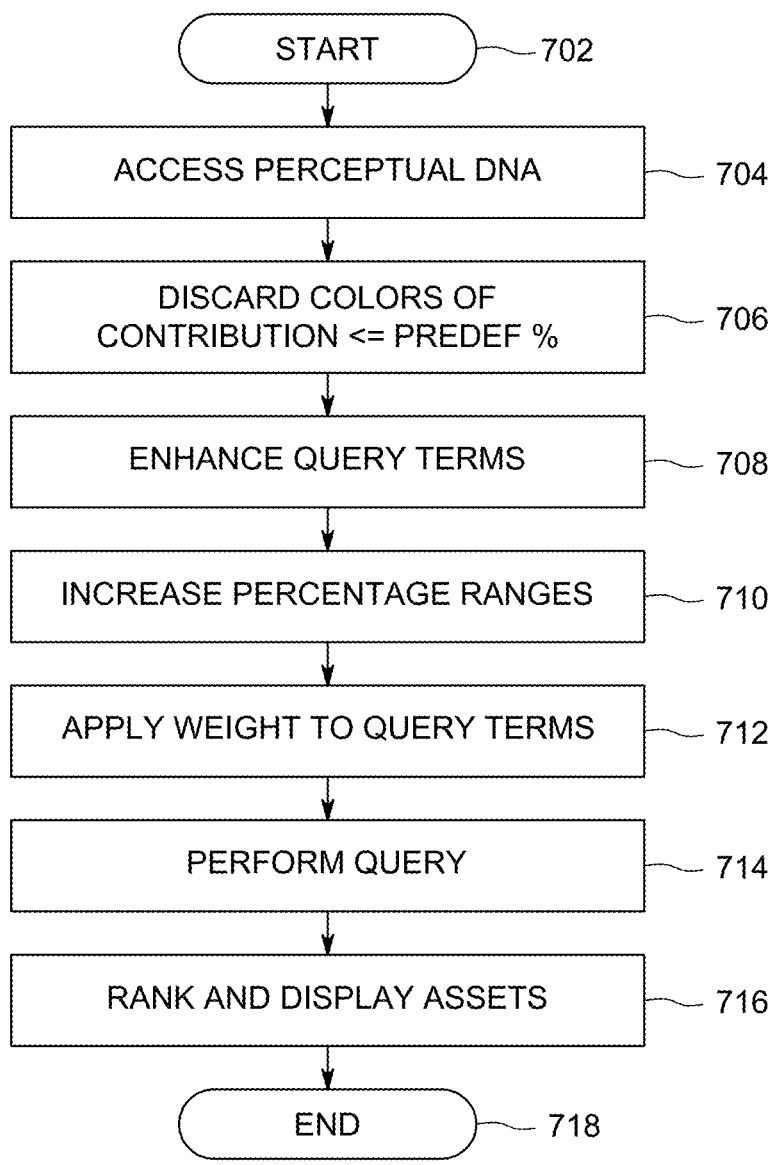
FIG. 7 depicts a flow diagram of a method for performing a search based on the perceptual DNA of an image, as performed by the search query module of FIG. 1, according to one or more embodiments.

FIG. 7 depicts a flow diagram of a method 700 for performing a search based on the perceptual DNA of an image as performed by the search query module 140 of FIG. 1, according to one or more embodiments. The method 700 removes color_ids that contribute little to the overall perceptual DNA, enhances the query to include similar colors and slightly more and less percentages of color before weighting the colors for the final search query.

The method 700 starts at step 702 and proceeds to step 704, where the method 700 accesses the perceptual DNA of an image. The perceptual DNA of an image is represented as a text tag. For example, an image may have a perceptual DNA of c7254p45, c4567p54, c231p1. This means color_id 7254 contributes 45% to the overall image, color_id 4567 contributes 54% to the overall image, and color_id 231 contributes 1% to the overall image.

The method 700 proceeds to step 706, where the method 700 discards the colors in the perceptual DNA that contribute less than a predefined percentage, for example color_ids that contribute less than or equal to 1%. This produces a reduced DNA of c7254p45, c4567p54 because the color_id 231 only contributed 1% to the image and was therefore discarded. In this example, the basic search query is:

c7254p45 OR c4567p54.

The method 700 proceeds to step 708, where the method 700 enhances the search query terms. The method 700 accesses the color lattice and determines the neighboring nodes for all of the color_ids in the basic search query. For example, c7254 may have neighbors c7259, c7164, and c7201. Further, c4567 may have neighbors c8365, c2764, c9264, and c1322. These terms are added to the search query with the same percent contribution as their neighboring node. The modified query becomes:

c7254p45 OR c7259p45 OR c7164p45 OR c7201p45 OR c4567p54 OR c8365p54 OR c2764p54 OR c9264p54 OR c1322p54

The method 700 proceeds to step 710, where the method 700 generates new terms by increasing the percentage ranges for each term by a predefined range, for example [−5%, +5%]. The new terms with the expanded ranges for c7254p45 are:

c7254p45 OR c7254p46 OR c7254p47 OR c7254p48 OR c7254p49 or c7254p50 OR c7254p44 OR c7254p43 OR c7254p42 OR c7254p41 OR c7254p40

New terms are similarly generated for each search term in the modified query generated in step 708. The new query expands to include plus and minus 5% of each term. For simplicity, consider the query terms generated from the base query term c7254p45 to be represented by $Q_1$ and the query terms generated from the base query term c4567p54 to be represented by $Q_2$. The method 700 proceeds to step 712, where the method 700 adds a weight to the query terms which is equal to the percentage of the base query term from which they were generated. The search query is:

$(Q_1)^{45}$ OR $(Q_2)^{54}$

The method 700 proceeds to step 714, where the method 700 performs the search for color assets comprising similar perceptual DNA to the image. The method 700 accesses the asset index to retrieve all assets whose perceptual DNA falls within the expanded query criteria. The method 700 proceeds to step 716, where the method 700 ranks and displays the retrieved assets in an order based on weights in the query. For example, the assets that match only $Q_1$ have a weight of 45. The assets that match only $Q_2$ have a weight of 54. The assets that match both $Q_1$ and $Q_2$ have a weight of 99 (45+54). The assets may be displayed in order starting with those with the highest weight to those assets with the lowest weight.

The method 700 proceeds to step 718 and ends.

Figure 8:
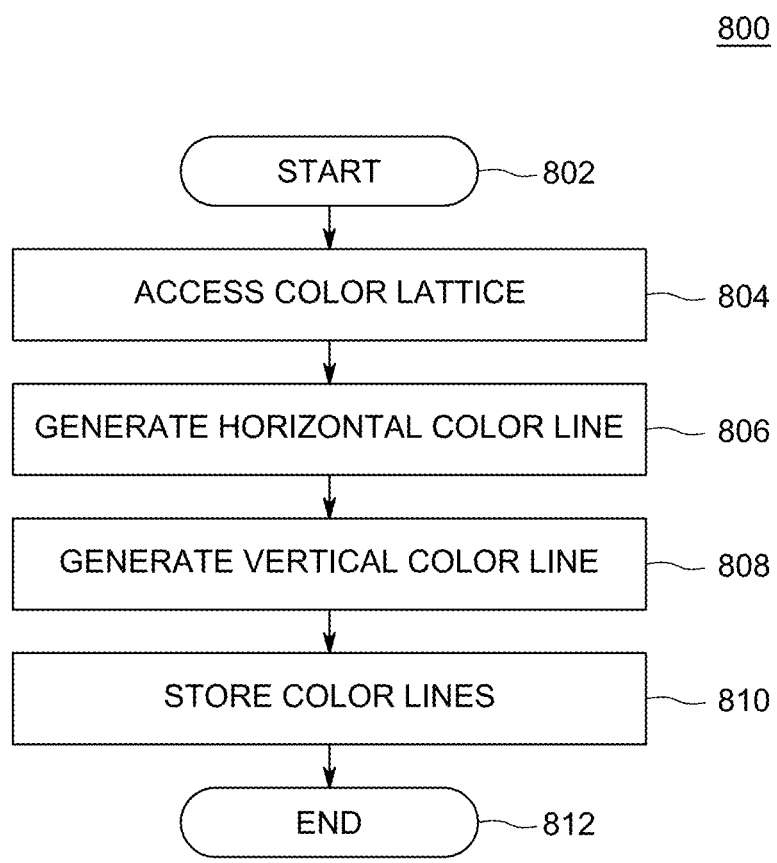
FIG. 8 depicts a flow diagram of a method for generating a vertical color line and a horizontal color line as performed by the color line generator of FIG. 1, according to one or more embodiments.

FIG. 8 depicts a flow diagram of a method 800 for generating a vertical color line and a horizontal color line as performed by the color line generator 124 of FIG. 1, according to one or more embodiments. The method 800 traverses the color lattice twice, once vertically and once horizontally to create a vertical color line of color_ids and a horizontal color line of color_ids. The color_ids in close proximity on the color lines are perceptually related colors. The method 800 is described in combination with FIGS. 9A and 9B, which illustrates the traversal through the color lattice.

Figure 9A:
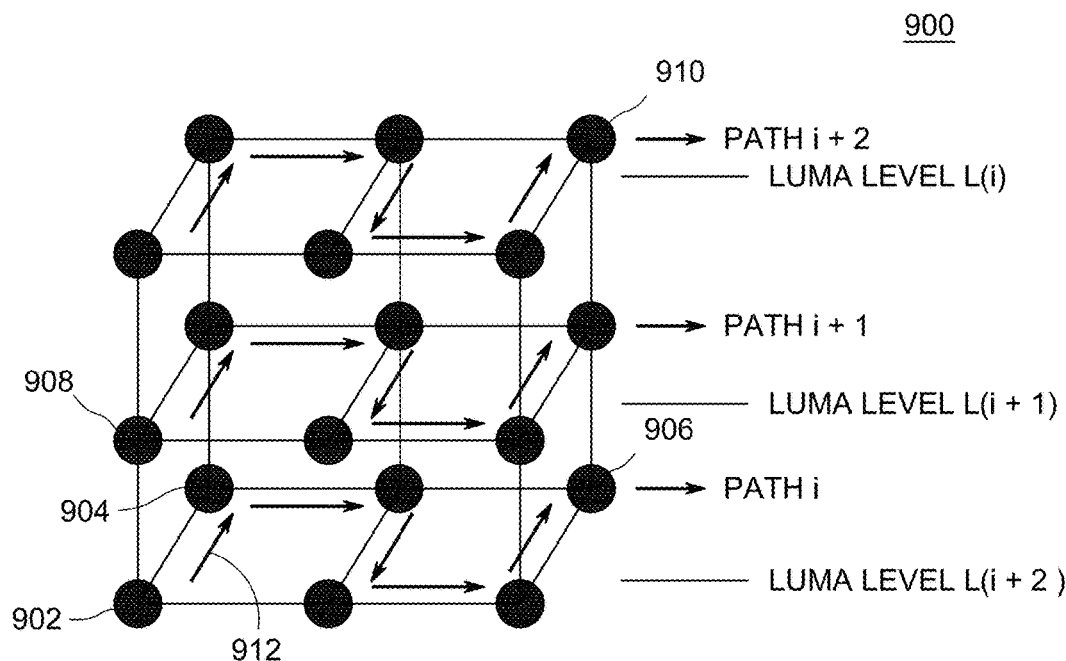
FIGS. 9A-9B together depict a color lattice comprising three luminosity planes, each plane comprising a plurality of nodes, which will be traversed by the method of FIG. 8.
Figure 9B:
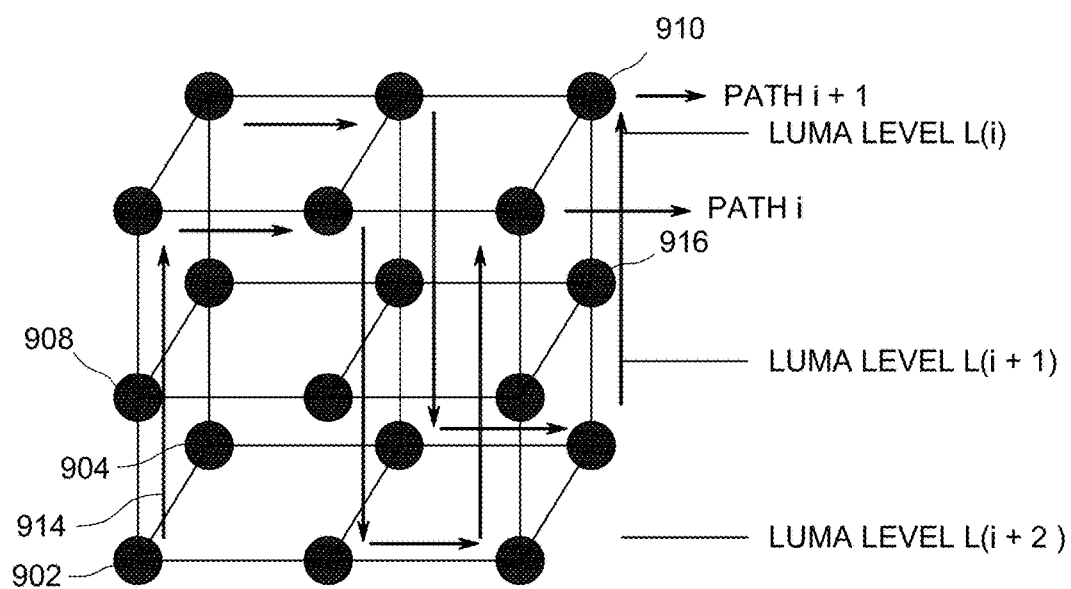

The method 800 starts at step 802 and proceeds to step 804. At step 804, the method 800 accesses the color lattice. FIGS. 9A-9B depict a color lattice 900 comprising three luminosity planes, each plane comprising a plurality of nodes, which will be traversed by the method 800 of FIG. 8. As described previously, each node is associated with a color_id that represents a mapping from one or more RGB values. The method 800 proceeds to step 806.

At step 806, the method 800 generates a horizontal color line. The method 800 generates the horizontal color line by traversing the color lattice. Although one exemplary path of traversal is disclosed herein, it is not meant to be limiting. The traversal may be performed using multiple paths, thereby generating a plurality of horizontal color lines. Alternatively, the traversal may take a different path than the exemplary path described herein. In the exemplary embodiment, the traversal begins at node 902 of FIG. 9A. The method 800 stores the color_id associated with the node 902. The method 800 proceeds to the next node 904, following the arrow 912 and stores the color_id associated with the node 904. The method 800 continues to traverse the entire luminosity level following the path of the arrows, recording the color_id associated with each node. When the last node 906 of the plane is reached, the method 800 traverses the next luminosity plane of the lattice beginning with node 908 and traversing the entire plane and storing the color_ids as described previously. The method 800 continues to traverse the color lattice until a color_id has been stored for each node in the color lattice. In the exemplary example, the traversal ends with node 910. The result is a horizontal color line comprising a plurality of color_ids. Every node of the lattice is now associated with a position in the horizontal color line. In addition, nodes in close proximity on the horizontal color line have perceptually related colors.

The method 800 proceeds to step 808, where the method 800 generates a vertical color line. Although one exemplary path of traversal is disclosed herein, it is not meant to be limiting. The traversal may be performed using multiple paths, thereby generating a plurality of vertical color lines. Alternatively, the traversal may take a different path than the exemplary path described herein. In the exemplary embodiment, the traversal begins at node 902 of FIG. 9B. The method 800 stores the color_id associated with the node 902. The method 800 proceeds vertically to the next node 908 on the next luminosity level, following the arrow 914 and stores the color_id associated with the node 908. The method 800 continues to traverse the color lattice following the path of the arrows, recording the color_id associated with each node. When the last node 916 of the vertical plane is reached, the method 800 continues to traverse the lattice beginning with node 904 and traversing by following the arrows and storing the color_ids as described previously. The method 800 continues to traverse the color lattice until a color_id has been stored for each node in the color lattice. In the exemplary example, the traversal ends with node 910. The result is a vertical color line comprising a plurality of color_ids. Every node of the lattice is now associated with a position in the vertical color line. In addition, nodes in close proximity on the vertical color line have perceptually related colors.

The method 800 proceeds to step 810, where the method 800 stores the horizontal and vertical color lines. The method 800 proceeds to step 812 and ends.

Figure 10:
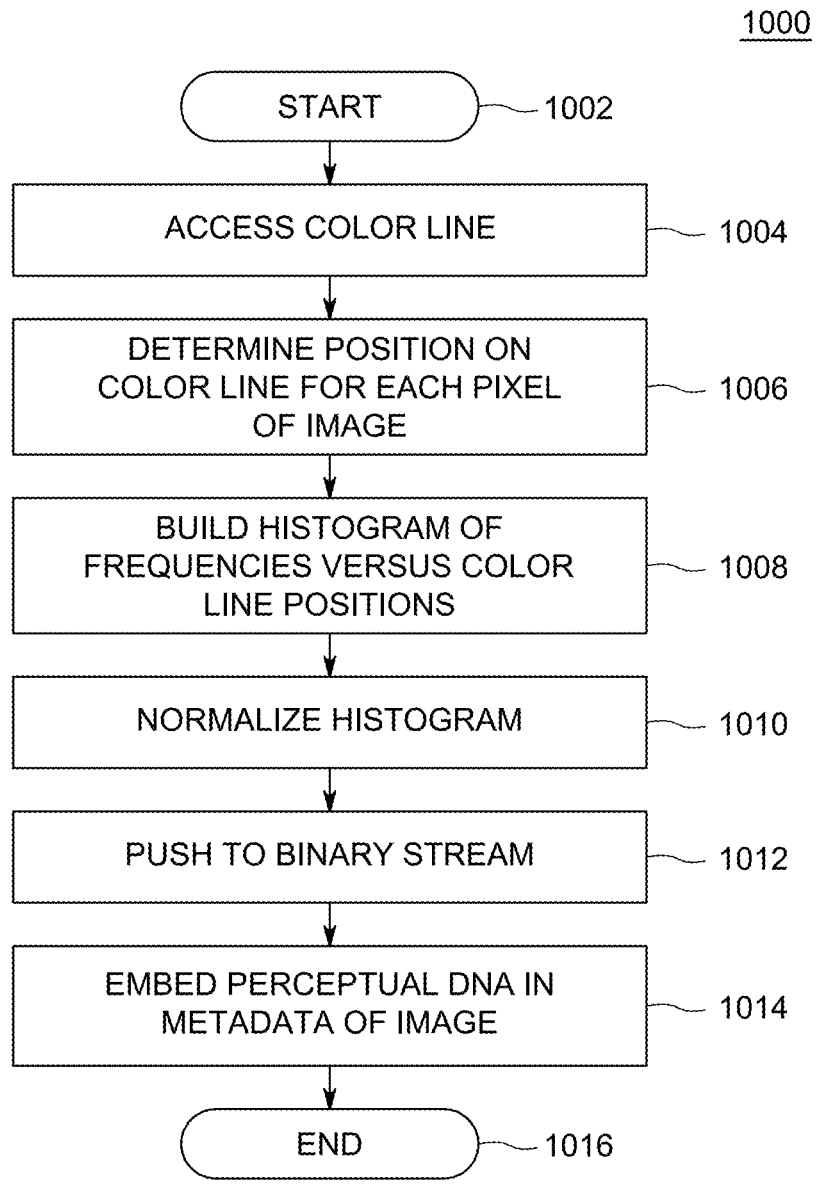
FIG. 10 depicts a flow diagram of a method for generating horizontal DNA and vertical DNA for an image, as performed by the perceptual DNA generator of FIG. 1, according to one or more embodiments.

FIG. 10 depicts a flow diagram of a method 1000 for generating horizontal DNA and vertical DNA for an image, as performed by the perceptual DNA generator 134 of FIG. 1, according to one or more embodiments. The method 1000 generates two perceptual DNAs for the image, one using the horizontal color line and another using the vertical color line.

The method 1000 starts at step 1002 and proceeds to step 1004, where the method 1000 accesses the color line. The method 1000 is performed twice. One pass is performed using the horizontal color line; the other pass is performed using the vertical color line. The method 1000 proceeds to step 1006, where the method 1000 determines the position of the color line for each pixel of the image. Each RGB values maps to a node on the color lattice, which then maps to a location on the color line. The method 1000 proceeds to step 1008, where the method 1000 builds a histogram of color line positions versus frequencies.

The method 1000 proceeds to step 1010, where the method 1000 normalizes the histogram to a predefined number of entries. In some embodiments, a predefined number of entries are retained. In other embodiments, frequencies representing a predefined minimum percentage are retained. The method 1000 proceeds to step 1012, where the method 1000 pushes the color line positions in the histogram to a binary stream and pushes the frequencies corresponding to the color line positions to a binary stream. This represents the perceptual DNA of the color line.

The method 1000 proceeds to step 1014, where the perceptual DNA of the color line is embedded in the metadata of the image. The method 1000 proceeds to step 1016 and ends.

Figure 11:
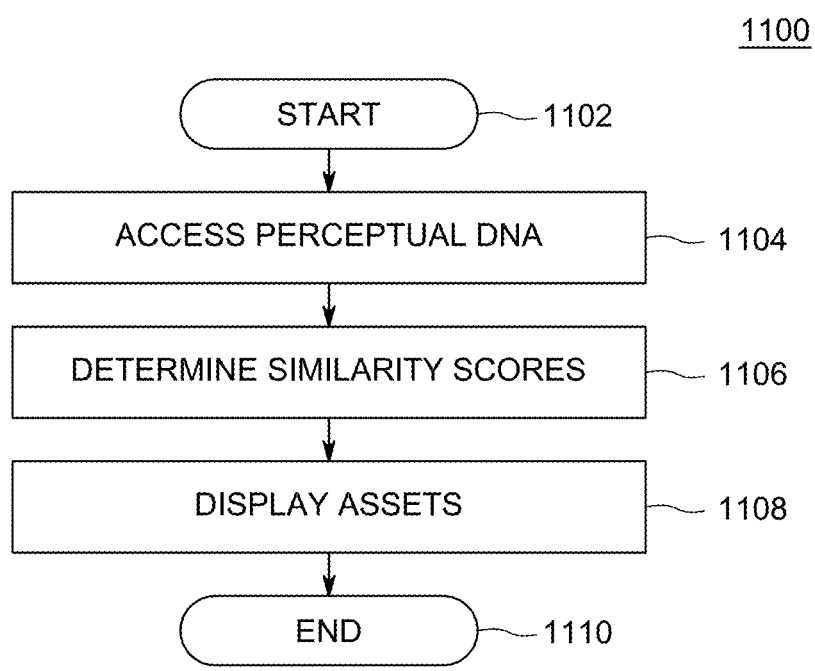
FIG. 11 depicts a flow diagram of a method for performing a search based on the horizontal and vertical perceptual DNAs of an image as performed by the search query module 10 of FIG. 1, according to one or more embodiments.

FIG. 11 depicts a flow diagram of a method 1100 for performing a search based on the horizontal and vertical perceptual DNAs of an image as performed by the search query module 140 of FIG. 1, according to one or more embodiments. The method 1100 performs a fast Kullback-Leiber divergence (KL_Div) based on the comparison between the perceptual DNAs from a plurality of assets and returns the assets with perceptual DNA most similar to the image.

The method 1100 starts at step 1102 and proceeds to step 1104. At step 1104, the method 1104 accesses the horizontal and vertical perceptual DNAs of the image. The method 1100 proceeds to step 1106, where the method 1100 compares the horizontal DNA of the image with the horizontal DNA of an asset. Because the perceptual DNAs are bit streams of the color line positions and their frequencies, the perceptual DNAs are probability distributions. A KL Div is performed to compare the horizontal DNA of the image and the horizontal DNA of the asset. A KL Div is also performed to compare the vertical DNA of the image and the vertical DNA of the asset. A similarity score for the asset is calculated based on the KL divergences. This step is repeated for assets in an asset index.

The method 1100 proceeds to 1108, where the method 1100 displays a predefined number of assets (n) possessing the highest (n) similarity scores. The method 1100 proceeds to step 1110 and ends.

FIGS. 12A-12F illustrates a search query using perceptual DNA as performed by the search query module 140 of FIG. 1.

Figure 12A:
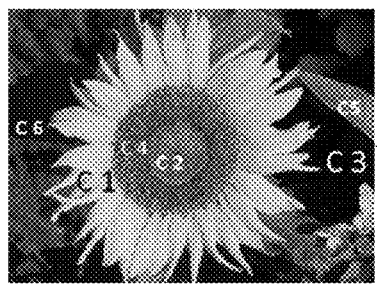
FIGS. 12A-12F illustrate a search query using perceptual DNA as performed by the search query module of FIG. 1.

FIG. 12A depicts an image 1202 is an image of a flower comprising a plurality of colors, C1, C2, C3, C4, C5, and C6. C1 is yellow. C2 is greenish yellow. C3 is black. C4 is orangish red. C5 is light green. C6 is very dark green.

Figure 12B:
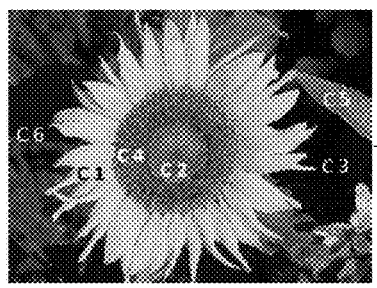

FIG. 12B depicts an asset 1204 that matches the query image 1202 in FIG. 12A. The asset 1204 is the same as image 1202 and is returned as the best match. The colors C1, C2, C3, C4, C5, and C6 match the colors of the image 1202 in FIG. 12 with the same frequency.

Figure 12C:
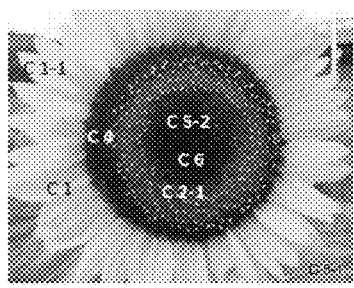

FIG. 12C depicts an asset 1206. Asset 1206 is returned as a match for image 1202 because it contains color C1-1, which is a lighter shade of C1 in image 1202. C2-1 is a slightly lighter shade of C2, C5-1 is a lighter shade of C5, C5-2 is a darker shade of C5. C1, C4, and C6 match the exact colors of image 1202.

Figure 12D:
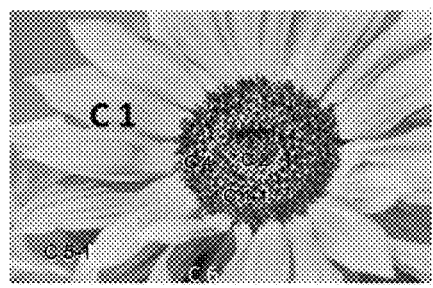

FIG. 12D depicts an asset 1208. Asset 1208 is returned as a match for image 1202 because it contains color C1-1, which is a darker shade of C1 mixed with C4 in image 1202. C5-1 is a lighter shade of C5. C1, C2, C4, and C6 match the exact colors of image 1202.

Figure 12E:
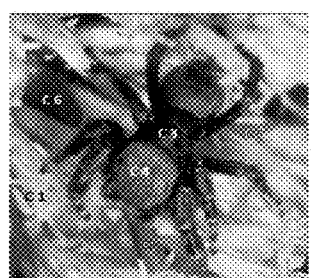

FIG. 12E depicts an asset 1210. Asset 1210 is returned as a match for image 1202 because it contains all of the colors of the image 1202 in varying quantity.

Figure 12F:

FIG. 12F depicts an asset 1212. Asset 1212 is returned as a match for image 1202 because it contains color C1-1, which is a lighter shade of C1 in image 1202. C5-1 is a lighter shade of C5. C1, C3, C4, C5, and C6 match the exact colors of image 1202

Therefore, assets are returned that comprise perceptual DNA comprising colors exactly the same as or similar to the queried image.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer-usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
accessing a three-dimensional color lattice with a plurality of color identifiers arranged in a plurality of planes, each plane corresponding to a perceptual luminosity range of a plurality of perceptual luminosity ranges within a perceptual color space, each color identifier representing a range of colors within a corresponding perceptual luminosity range of the perceptual color space, wherein each color is perceptually indistinguishable from other colors belonging to the same range of colors, and wherein each range of colors contains at least one color that is perceptually distinguishable from at least one other color from every other range of colors;
generating a one-dimensional color line from the three-dimensional color lattice by sequentially traversing color identifiers in planes of the color lattice in an order based on adjacent color identifiers in each plane and adding the color identifiers to the one-dimensional color line based on the order of traversing the color identifiers;
accessing an image comprising a plurality of pixels; and
generating a perceptual DNA for the image based on the one-dimensional color line by:
determining, by at least one processor, a color identifier from the one-dimensional color line for each pixel in the plurality of pixels in the image; and
generating, by the at least one processor, a histogram of from the one-dimensional color line based on the determined color identifiers.

2. The method of claim 1, further comprising generating the three-dimensional color lattice by:
mapping the colors of a non-perceptual color space to the colors of the perceptual color space;
determining the plurality of perceptual luminosity ranges within the perceptual color space;
determining a plurality of sub-regions within each perceptual luminosity range of the plurality of perceptual luminosity ranges, wherein within each sub-region, color differences are perceptually indistinguishable, and wherein each sub-region contains at least one color that is perceptually distinguishable from at least one other color from every other sub-region;
generating a plane of the color lattice for each perceptual luminosity range of the plurality of perceptual luminosity ranges; and
generating a node for each sub-region within each plane of the color lattice; and
assigning a color identifier to each node.

3. The method of claim 1, wherein adjacent color identifiers on the one-dimensional color line are more perceptually similar in color than distant color identifiers on the one-dimensional color line.

4. The method of claim 1, wherein generating the perceptual DNA further comprises, for each pixel in the image:
identifying an RGB value for each pixel in the image; and
mapping the RGB value for each pixel in the image to a corresponding color identifier of the one-dimensional color line.

5. The method of claim 3, further comprising performing a search of one or more other images based on the perceptual DNA of the image and a perceptual DNA of the one or more other images.

6. The method of claim 5, wherein performing the search comprises: comparing the histogram from the one-dimensional color line based on the determined color identifiers with the perceptual DNA of the one or more other images, wherein the perceptual DNA of the one or more other images comprises a second histogram from the one-dimensional color line corresponding to the one or more other images.

7. The method of claim 1, wherein sequentially traversing color identifiers in the planes of the color lattice in the order comprises:
    traversing from a first color identifier in a first plane of the color lattice to a second color identifier in the first plane, wherein the second color identifier is adjacent to the first color identifier in the first plane; and
    traversing from a last color identifier in the first plane to a first color identifier in a second plane, wherein the first color identifier in the second plane is adjacent to the last color identifier in the second plane within the color lattice.

8. A non-transitory computer-readable medium storing instructions thereon that, when executed by at least one processor, cause a computer system to:
    access a three-dimensional color lattice with a plurality of color identifiers arranged in a plurality of planes, each plane corresponding to a perceptual luminosity range of a plurality of perceptual luminosity ranges within a perceptual color space, each color identifier representing a perceptually distinguishable color within a corresponding perceptual luminosity range of the perceptual color space;
    generate a one-dimensional color line from the three-dimensional color lattice by sequentially traversing color identifiers in planes of the color lattice in an order based on adjacent color identifiers in each plane and adding the color identifiers to the one-dimensional color line based on the order of traversing the color identifiers;
    access an image comprising a plurality of pixels; and
    generate a perceptual DNA for the image based on the one-dimensional color line by:
        determining a color identifier from the one-dimensional color line for each pixel in the plurality of pixels in the image;
        transforming the color identifier for each pixel in the plurality of pixels in the image to a binary value;
        determining a frequency of each color identifier; and
        generating a binary stream from the one-dimensional color line utilizing the binary values for each pixel in the plurality of pixels and the frequency of each color identifier to form the perceptual DNA for the image.

9. The non-transitory computer-readable medium of claim 8, further comprising instructions that, when executed by the at least one processor, cause the computer system to generate the color lattice by:
    mapping the colors of a non-perceptual color space to the colors of the perceptual color space;
    determining a plurality of perceptual luminosity ranges within the perceptual color space;
    determining a plurality of sub-regions within each perceptual luminosity range of the plurality of perceptual luminosity ranges, wherein within each sub-region, color differences are perceptually indistinguishable;
    generating a plane of the color lattice for each perceptual luminosity range of the plurality of perceptual luminosity ranges;
    generating a node for each sub-region within each plane of the color lattice; and
    assigning a color identifier to each node.

10. The non-transitory computer-readable medium of claim 8:
    wherein determining the frequency of each color identifier comprises calculating a percentage contribution of each color identifier to the image; and
    wherein generating the binary stream utilizing the binary values for each pixel in the plurality of pixels and the frequency of each color identifier comprises generating the binary stream based on the calculated percentage contribution of the color identifier.

11. The non-transitory computer-readable medium of claim 8, wherein sequentially traversing color identifiers in the planes of the color lattice in the order comprises traversing from a first color identifier in a first plane of the color lattice to a second color identifier in the first plane, wherein the second color identifier is adjacent to the first color identifier in the first plane.

12. The non-transitory computer-readable medium of claim 10, further comprising instructions that, when executed by the at least one processor, cause the computer system to:
    perform a search of one or more other images by comparing the perceptual DNA of the image to the perceptual DNA of a plurality of other images; and
    present at least one of the plurality of other images found to correspond to the perceptual DNA of the image.

13. The non-transitory computer-readable medium of claim 12, wherein comparing comprises comparing the binary stream with binary streams corresponding to the perceptual DNA of the plurality of other images.

14. The non-transitory computer-readable medium of claim 9, wherein adjacent nodes on a plane in the color lattice are more similar in color than distant nodes on the plane.

15. A computer implemented method for quantifying color perception of digital images comprising:
    generating a color lattice by:
        creating planes within a perceptual color space, each plane corresponding to a perceptual luminosity range within the perceptual color space;
        creating nodes on the planes, each node corresponding to a perceptually distinguishable color within each perceptual luminosity range; and
        assigning a color identifier to each node;
    generating a vertical color line by traversing at least three nodes of the color lattice in sequence, each of the at least three nodes falling within different planes of the created color lattice, and assigning color identifiers associated with the at least three nodes to adjacent positions on the vertical color line;
    generating a horizontal color line different from the vertical color line by traversing more than two nodes of the color lattice in sequence, each of the more than two nodes falling within a same plane of the created color lattice, and assigning color identifiers associated with the more than two nodes to adjacent positions on the horizontal color line;
    accessing an image containing a plurality of pixels;
    determining, by at least one processor, a position on the vertical color line for each pixel in the plurality of pixels and a position on the horizontal color line for each pixel in the plurality of pixels; and creating a horizontal histogram of frequency and position on the horizontal color line for the image and a vertical histogram of frequency and position on the vertical color line for the image.

16. The method of claim 15, further comprising creating a horizontal perceptual DNA by converting the frequency and positions on the horizontal color line to at least one binary stream; and creating a vertical perceptual DNA by converting the frequency and positions on the vertical color line to at least one binary stream.

17. The method of claim 16, further comprising accessing a plurality of other images;

creating a horizontal perceptual DNA for each of the plurality of other images;

creating a vertical perceptual DNA for each of the plurality of other images;

searching the plurality of other images by comparing the horizontal perceptual DNA for the image with the horizontal perceptual DNA for each of the plurality of other images and comparing the vertical perceptual DNA for the image with the vertical perceptual DNA for each of the plurality of other images.

18. The method of claim 17, wherein comparing comprises performing a Kullback-Leiber divergence and calculating a similarity score for each of the plurality of other images.

19. The method of claim 18, wherein:

traversing the at least three nodes of the color lattice comprises beginning at a node of an initial plane of the color lattice, traversing next to a node of a second plane of the color lattice adjacent to the initial plane, and traversing next to a node of a third plane of the color lattice adjacent to the second plane; and traversing the more than two nodes comprises beginning at a first node of a first plane of the color lattice, traversing next to a second node adjacent to the first node from the first plane, and traversing next to a third node adjacent to the second node from the first plane.

* * * * *